US007107396B2

(12) United States Patent
Factor et al.

(10) Patent No.: US 7,107,396 B2
(45) Date of Patent: Sep. 12, 2006

(54) CHAINING OF BLOCKS FOR OPTIMAL PERFORMANCE WITH DASD (DIRECT ACCESS STORAGE DEVICES) FREE NONVOLATILE UPDATES

(75) Inventors: Michael Factor, Haifa (IL); Rivka Matosevich, Zichron Yaacov (IL); Sivan Tal, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 10/699,149

(22) Filed: Oct. 31, 2003

(65) Prior Publication Data

US 2005/0097266 A1    May 5, 2005

(51) Int. Cl.
*G06F 12/02*    (2006.01)
(52) U.S. Cl. .................... 711/112; 711/170; 711/173
(58) Field of Classification Search ................ 711/112
See application file for complete search history.

(56) References Cited

U.S. PATENT DOCUMENTS

| | | | | |
|---|---|---|---|---|
| 4,961,134 A | * | 10/1990 | Crus et al. .................... 707/8 |
| 5,568,639 A | * | 10/1996 | Wilcox et al. ............... 707/200 |
| 5,652,864 A | * | 7/1997 | Hine ........................... 711/171 |
| 6,012,063 A | * | 1/2000 | Bodnar ........................ 707/101 |
| 6,694,318 B1 | * | 2/2004 | Howard ........................ 707/10 |
| 2003/0191745 A1 | * | 10/2003 | Jiang et al. ..................... 707/2 |

\* cited by examiner

*Primary Examiner*—Reginald G. Bragdon
*Assistant Examiner*—Leonid Kravets
(74) *Attorney, Agent, or Firm*—Stephen C. Kaufman

(57) ABSTRACT

A system for managing variable sized pages of possibly non contiguous blocks in a Non-Volatile-Storage (NVS) for attaining a consistent NVS that survives malfunction events. Each page includes a self describing block or linked list of self describing blocks. the system includes: Volatile Storage storing auxiliary modules, means for performing an atomic "create a new page" procedure. Means for performing an atomic write "add block" procedure for adding a possibly non contiguous block to a page. The newly added block has a back pointer to a previous block in the page. Means for performing a "delete page" procedure for deleting all blocks in a page. Means for performing a recovery procedure for rolling backward the add block procedure and rolling forward the delete page procedure, in case of malfunction event, thereby attaining consistent NVS.

9 Claims, 2 Drawing Sheets

CHAINING OF BLOCKS FOR OPTIMAL PERFORMANCE WITH DASD (DIRECT ACCESS STORAGE DEVICES) FREE NONVOLATILE UPDATES

FIELD OF THE INVENTION

This invention relates to chaining of blocks for optimal performance with DASD (Direct Access Storage devices) free nonvolatile updates.

BACKGROUND OF THE INVENTION

"Journaling" of cached meta-data updates in a Non Volatile Storage device (NVS) to maintain consistency of meta-data while performing fast updates, is a widely used approach in storage subsystems controllers. US Patent publication US 2002/0083263 A1 entitled ("DASD-free nonvolatile updates") describes an innovative mechanism, partitioning the NVS space into fixed sized blocks, and dynamically assigning the NVS blocks to meta-data entities (e.g. meta-data logical blocks). An NVS block serves as a journal page for the meta-data entity (i.e. the content data stored in the page), and the association is maintained until the meta-data is hardened to DASD or deleted/discarded therefrom, i.e. the Journal is no longer necessary for recovery. Note that whenever the term hardened is used it should be interpreted as hardened or deleted or discarded.

Having a constant size Journal page (which is the size of an NVS block) may have an adverse effect on the system's performance. Smaller blocks means more blocks for a fixed size NVS, allowing more entities to be associated with journal pages at a time—reducing the frequency of having to harden entities when a lot of entities are being updated. On the other hand, larger blocks allow more updates to be recorded in a journal page—reducing the frequency of having to harden an entity that is updated frequently.

It is very difficult to adjust the block size for optimal performance. In fact, it is practically impossible, because different operational environments dictate different optimal block size. A variable-sized journal page that adjusts to the frequency of updates of its associated entity, can provide better system performance than a fixed size page, in any run-time environment, and especially in the heterogeneous and dynamic environment that is typical to large storage subsystems.

However, having a variable size page (a page that can grow in run-time) is a challenging problem in a system that must be consistent and self-descriptive at any given point in time. Note also that one can atomically update only a contiguous, limited in size, NVS memory space. In other words, it is practically impossible to maintain contiguous NVS memory pages that can dynamically grow, depending upon the particular application.

There is, accordingly, a need in the art to provide for a method and system of chaining NVS blocks to form fragmented, arbitrarily long pages.

SUMMARY OF THE INVENTION

In accordance with the invention, there is provided a method and system for chaining self describing Non-Volatile-Storage (NVS) blocks to form consistent, fragmented, arbitrarily long pages, for use, e.g., in a storage controller of backup systems. Note that the term (protected) entity, refers to an entity that needs to be protected and it or a coded version thereof (hereinafter protected contents) is stored in one or more NVS blocks.

The method and system are applicable to any kind of "NVS" device/software/hardware and any volatile soft/hard/logical/physical entity, given that the "NVS" is a memory-like storage with a persistency level higher than the persistency of the conventional memory (e.g. volatile memory) that stores the protected "entity".

In accordance with an embodiment of the invention, NVS blocks are used as building blocks for variable sized journal pages. A journal page consists of a list of blocks. Since the blocks are dynamically allocated, the pages are fragmented—giving rise to a linked list of blocks. A journal page initially consists of one block, and new blocks are linked on demand, according to run-time events. The linked list is, preferably although not necessarily, single directional with backward pointers, for reasons that will be described in greater detail below. A journal page may be deleted (and its blocks freed), once the protected entity is hardened, i.e., there is no longer a need to store the protected contents in the NVS.

In accordance with the backing memory method and system:

1. All the backup data must be self describing and consistent at any point in time. Note that the definition of "Consistent" in this context includes: data that maintains its semantic meaning through all malfunction events (such as power failure). The definition of "self describing" in this context includes: data that expresses all its semantic contents without having to read any other data to interpret it correctly. In accordance with one implementation, self describing data includes data that has meta-data that identifies it. Thus, by this specific implementation, each Journal block contains meta-data that identifies the entity that is associated with the journal block and identifies the page to which the block belongs and its relative position in the page.
2. An atomic write to the backing memory can only be done to a contiguous sequence of bytes, limited in size. The term "atomic write", means that either a writing operation has successfully terminated, or, it has not occurred at all. In other words, no "partial write" is permitted, even in the event of a malfunction event.

In accordance with an embodiment of the invention there are provided the following procedures:
  1) Create a new page consisting of a single block.
  2) Add a block to a page in an atomic operation.
  3) Delete a page. Note that this procedure is not atomic, but the operation is always fully rolled-forward if interrupted by a malfunction event. A typical (yet not exclusive) example of malfunction event is a power failure.

Accordingly, the invention provides for a method for managing variable sized pages of possibly non contiguous blocks in a Non-Volatile-Storage (NVS) for attaining a consistent NVS image that survives malfunction events; each page includes a self describing block or a linked list of self describing blocks, the method comprising:
  (a) providing auxiliary modules stored in Volatile Storage;
  (b) providing an atomic "create a new page" procedure;
  (c) providing an atomic "add block" procedure for adding a possibly non contiguous block to a page; the newly added block has a back pointer to a previous block in the page;
  (d) providing a "delete page" procedure for deleting all blocks in a page;
  (e) providing at least one recovery procedure for rolling backward said add block procedure and rolling forward the delete page procedure, in case of malfunction event, thereby attaining consistent NVS.

The invention further provides for a Non-Volatile-Storage (NVS) that includes variable sized pages of possibly non contiguous blocks; each page includes a self describing block or linked list of self describing blocks, using backward pointing scheme; said NVS is not susceptible to inconsistency in response to "create a new page", "add block to a page", or "delete blocks in a page" operations, irrespective of any intervening malfunction event.

Still further, the invention provides for a system for managing variable sized pages of possibly non contiguous blocks in a Non-Volatile-Storage (NVS) for attaining a consistent NVS that survives malfunction events; each page includes a self describing block or linked list of self describing blocks, the system comprising:

Volatile Storage storing auxiliary modules;

means for performing an atomic "create a new page" procedure;

means for performing an atomic "add block" procedure for adding a possibly non contiguous block to a page; the newly added block has a back pointer to a previous block in the page;

means for performing a "delete page" procedure for deleting all blocks in a page;

means for performing at least one recovery procedure for rolling backward said add block procedure and rolling forward said delete page procedure, in case of malfunction event, thereby attaining consistent NVS.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The description below, with reference to certain embodiments of the invention, refers to an example of backup memory. The invention is by no means bound by this example and accordingly, the invention embraces any application which requires to quickly and securely update entities. By one embodiment, a memory space is regarded as a logical array of fixed size blocks. A block consists of a contiguous stream of bytes in memory. A block stores/contains data that pertains to a meta-data entity. The block can be linked to another block. A chain of one or more linked blocks, all associated with an entity, forms a page. A page is not necessarily a contiguous stream of bytes, because a block can be linked to other, not necessarily contiguous block.

Figure 1:
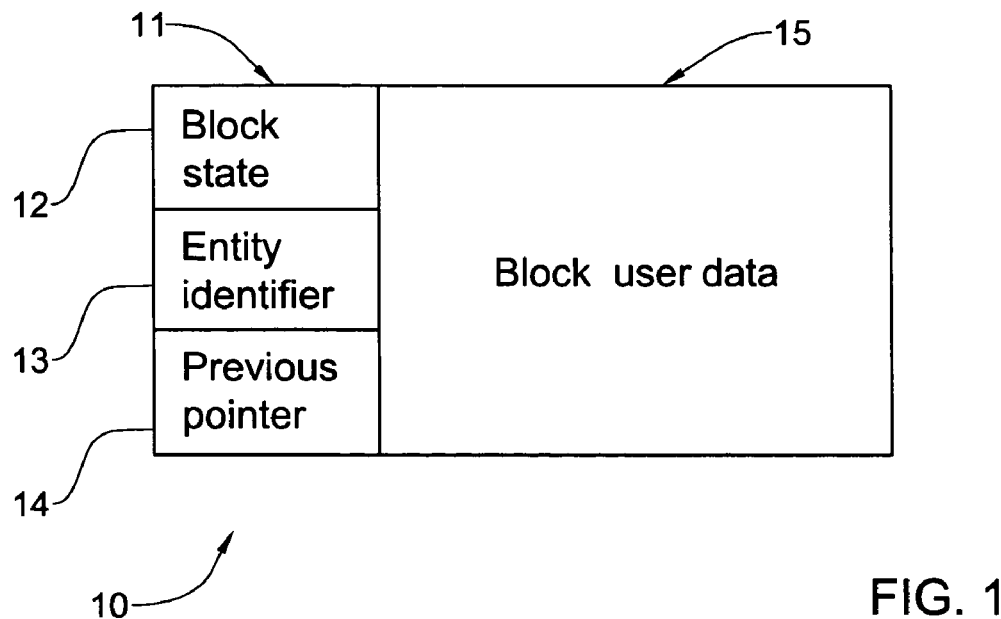
FIG. 1 is a schematic illustration of a block in an NVS page, in accordance with an embodiment of the invention.

Consider the following exemplary structure of a block (10) (with reference to FIG. 1):

Block header (11):

Block state (12): 'free'; 'used'; 'used-chained'.

Entity identifier (13). Applicable if state is not free.

Prev pointer (14). Pointer to previous block in chain. Applicable if state is 'used-chained'.

Block user data (15):

The rest of the block contains data that pertains to the protected entity.

Note that the block structure is self describing and contains the protected data and the header.

Those versed in the art will readily appreciate that the invention is, of course, not bound by this specific structure of block.

There follows a description of three basic supported operations that manipulate NVS blocks, and their algorithms, in accordance with one embodiment of the invention.

There are auxiliary modules that include:

A database of free blocks, allowing efficient allocation/de-allocation (release) of blocks for use in journal pages.

A database of entity-to-page associations, allowing efficient access to the journal page, given an entity id (hereinafter called an Association database). More particularly—it allows access to the last (current) block in the page.

Note that the invention is not bound by these particular auxiliary modules, for example, provision of offset to free area in the NVS block, or use of a bi-directional pointer scheme. Note that for convenience only, the description below refers mainly to a forward pointer scheme in the auxiliary module.

Note also that the specified databases can be realized in standard volatile memory using known per se techniques (such as linked lists and hash tables), and accordingly these techniques will not be further elaborated herein. The required persistency of the auxiliary modules is less than the persistency of the protected volatile entities and, accordingly, they can be stored in say, conventional volatile storage. Note that in case of malfunction event that requires to apply recovery, the self-describing NVS (e.g. backing memory), is regarded as reliable, and enables rebuilding of the auxiliary modules in the case that they are lost.

Figure 2:
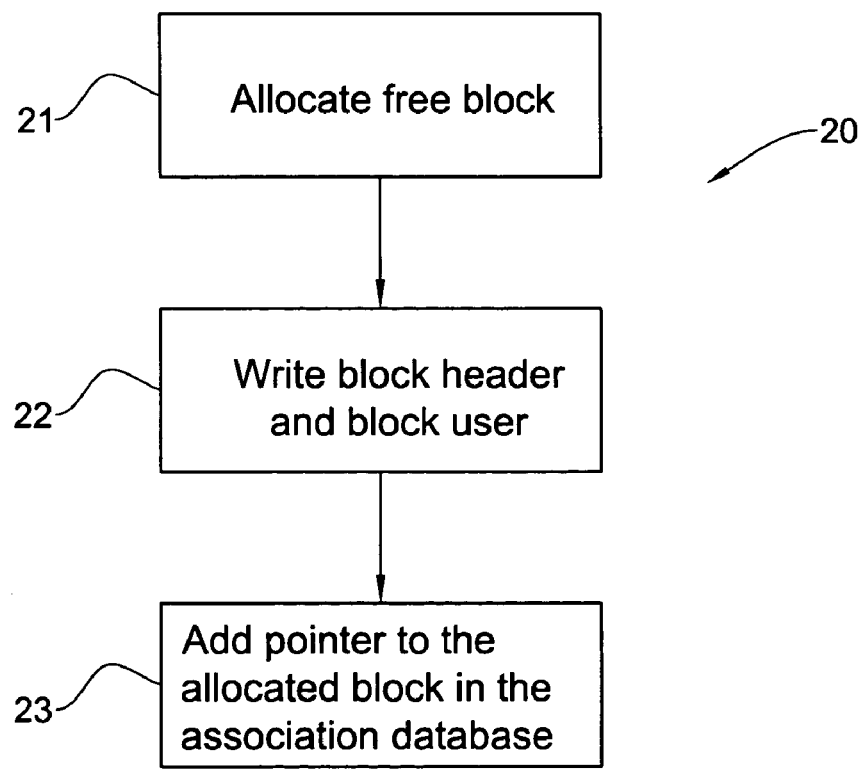
FIG. 2 is a flow chart illustrating a create a new page operation, in accordance with an embodiment of the invention.

Thus, attention is drawn to FIG. 2 illustrating a flow chart of a first (from among the three) procedure being Create a new page and store therein protected contents (representative of protected entity) (20). This action is performed when an entity is updated and the update requires protection, and the entity does not already have a journal page that stores its associated protected contents.

As shown, the first stage is Allocate a free block 21 (using the free blocks database), and write block header and data into it (22): i.e. associated entity id field, 'used' block state and write the protected data in the Block user data field.

Note that the associated entity id field identifies the protected entity, considering that typically (although not necessarily) the protected contents of the protected entity is a coded version of the latter, and in the case of malfunction event that gives rise to the loss of protected entity data (which, as recalled, is normally stored in a storage having lower persistency than that of the NVS, and is therefore more susceptible to loss of data in case of malfunction event, such as power failure) there is only limited data (i.e. the protected contents) that serves for restoring the protected entity. The associated entity id would then provide additional information that enables (together with the protected contents stored in the NVS and the older hardened image) to restore the protected entity.

Note also that the latter stage 22 is atomic, meaning that the block header (and possibly the block contents see, e.g. 15 in FIG. 1) are written in a single memory operation. It should be noted that the realization of atomic operations in the context of NVS, is generally known per se and will not be further described herein. Next (23), in the Associations database, add pointer to the allocated block.

Note that the invention is not bound by this specific realization of Create a new page procedure, for instance the order or steps (22) and (23) may be reversed.

Figure 3:
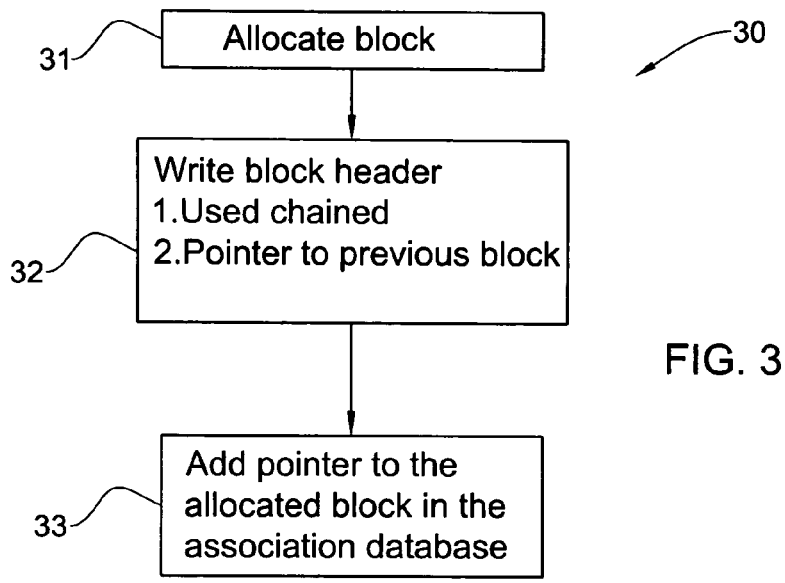
FIG. 3 is a flow chart illustrating an add block operation, in accordance with an embodiment of the invention.

Attention is now drawn to FIG. 3, illustrating a flow chart of Add a block to an existing page operation (30), in accordance with an embodiment of the invention. This action is performed when an entity is updated and the Journal page associated with the entity does not have enough free space for protecting the update. The Journal page is then expanded by allocating a block and linking the block to the other blocks in the page.

As shown, the first stage is Allocate a free block (31), and write block header into it, including: associated entity id, 'used-chained' block state and pointer to previous block and write block data (32). Note that the latter stage 32 is atomic, meaning that the block header and contents are written in a single memory operation. Next, (33) In the Associates database, update pointer to point to the newly allocated block.

Figure 4A:
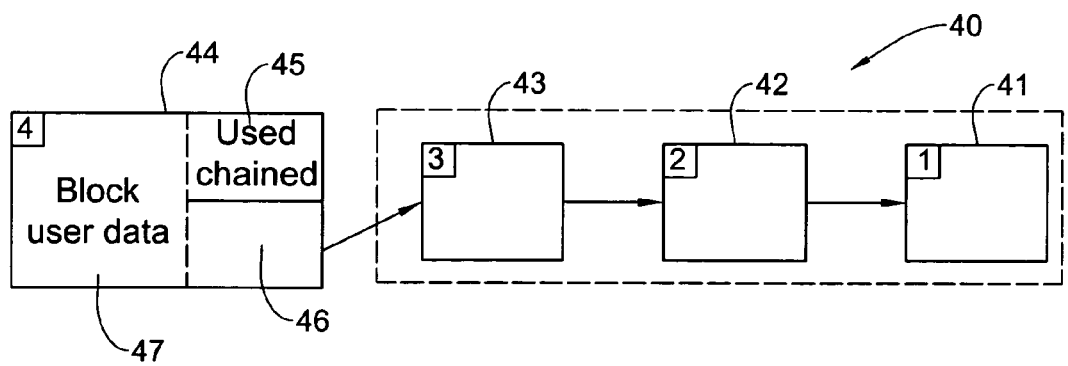
FIG. 4A illustrates, schematically, a page structure in the NVS after applying add block procedure, in accordance with an embodiment of the invention.

FIG. 4A illustrates, schematically, a page structure in the NVS after applying Add block procedure in accordance with the embodiment described in FIG. 3. Assume that before applying the Add block procedure (30), the page 40 includes three blocks (not necessarily contiguous in the memory) # 41, 42 and 43. Note that blocks 42 and 43 point backward to their previous block (41 and 42, respectively). Now, assume that further update of the protected entity (and consequently the protected contents) give rise to an overflow and that accordingly a new block 44 should be updated. Block 44 is identical to the other blocks but is shown, for clarity only, in a larger scale. Note incidentally, that the invention is not bound by utilization of blocks of identical size.

As shown, the block's header Block state field (45) has a 'used-chained' state, the Entity identifier field includes Entity identifier data (not shown) and Prev pointer field (46) Points to the previous block in chain (43). Note, that the fact that the last block in the chain is 43 can be figured out from the association database which points to the last block in the chain In the NVS. The last block (43') (corresponding to block 43 in page 40) has, say, null pointer and is therefore identified as the last block in the chain to which the newly added block (44) should be linked by means of backward pointer.

Reverting now to block (44), the Block user data field (47) includes the entity data stored in the block. Note that header data and possibly also the user block data (47) have been written in an atomic "write" operation (i.e. the contents of fields (45, 46 and 47) have been written in a single memory operation). Obviously, to this end the data has been prepared in advance in certain volatile memory buffer (not shown) and has been copied to the designated areas in block (44). Note incidentally, that an atomic write operation applies to the header part of the block and although not necessary may also apply to the block user data.

Figure 4B:
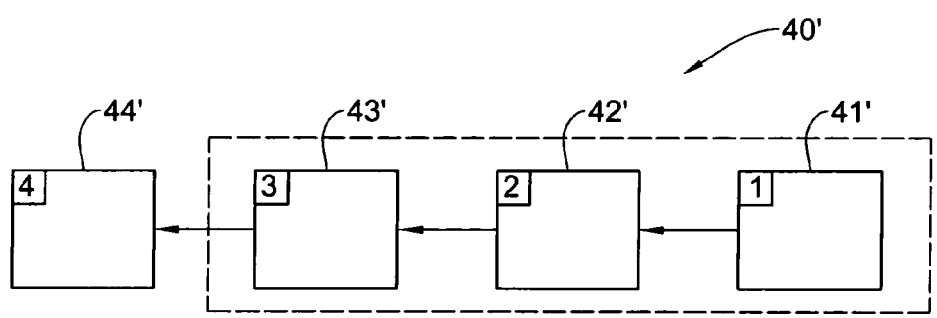
FIG. 4B illustrates, schematically, a page structure, in the volatile association database after applying add block procedure, in accordance with an embodiment of the invention.

FIG. 4B illustrates, schematically, a page structure, in the volatile association database after applying add block procedure, in accordance with the embodiment of FIG. 3. Blocks (41 to 44) depicted in FIG. 4A, correspond to blocks (41' to 44') in FIG. 4B, respectively. Note that in contrast to the backward pointing of the blocks in the NVS page (40), the page (40') in the volatile storage employ by this non-limiting example forward pointing scheme, i.e. block (41') points to block (42') etc. As explained above, other variants are applicable, e.g. use of bi-directional pointer scheme.

Having described an add block procedure in accordance with an embodiment of the invention, there follows a description of a recovery procedure, after a malfunction event occurs (such as but not limited to power failure). As will be evident, NVS consistency is maintained. Thus, consider that a malfunction event has occurred (e.g. power disruption) whilst adding block (44). Since the add block 44 is an atomic write operation, the pointer to block 43 (in field 46) will be valid (i.e. pointing to block 43) only if the meta data (i.e. the contents of the block header) has been written to block 44 (i.e. the 'used chain' state in field 45, the entity identified field (not shown) and the previous pointer field). In the case that system crash is encountered before (or during) the atomic write operation, the block state will be "free" and therefore consistency is maintained since the last block remains (43) (i.e. block 44 was not added).

Now, after system recovery, either the "add block" operation is successfully completed, or the system is reverted to the state before the add block operation was started.

There follows a description of a recovery procedure (following the malfunction event) in accordance with an embodiment of the invention. Note that for the recovery procedure, the data in the NVS is considered consistent, and as a first stage, the auxiliary modules need to be restored, based on the consistent block structure in the NVS. Thus, the blocks of the NVS are scanned to identify linked lists (or partial linked lists, which can be present due to "delete page" procedure, all as described in greater detail, below). Reverting now to the example of FIG. 4A, and assuming that the 'atomic write' operation of block 44 has not been terminated successfully, then the only consistent linked list that is found is of blocks 31 to 33.

Note that the fact that block 44 has been allocated (in step 31) but atomic write operation has not been terminated successfully, whilst seemingly appearing to be in-consistent, it is easily resolved in the recovery procedure. This stems from the fact that, the allocated block 44 has a default status "free", (which would have changed to "used-chained" had the atomic write operation 32 been completed successfully; or would have changed to "used" had this block been the first one in a new list), and accordingly, the block is readily identified as a free block which should be returned to the free block database. The latter operation exemplifies a roll backward procedure, where "the add block" operation is entirely undone as if it did not happen.

Having identified the list(s) in the NVS, a corresponding list(s) is constructed, at the association database (by this example, blocks 41' to 43') and the free blocks database is updated to include all blocks except 41 42 and 43.

Note that had forward pointing scheme been used instead of backward pointing scheme, an atomic write operation could not be guaranteed, since "add block" operation would always involve two atomic operations. Thus, the first atomic operation would be "write block" including the update of fields, (45, 47 and block identifier (not shown) for block (44) and a second "atomic write" would be updating a forward pointer from block (43) to (44). The reason that two "atomic write" operations are involved is that the first atomic write operation is performed in block (43) updating the forward pointer to point to block (44) and the second involves writing the header data (and possibly the block user data) to block (44). Thus, a forward pointing scheme is inherently wasteful, as it requires two atomic operations (rather than one) during each add block operation, and considering that atomic write to NVS is a relatively expensive operation, using two such operations, for each "add block" operation, is obviously, undesired. Note that the backward pointing scheme of the invention is not bound by this particular advantage.

It is accordingly appreciated that insofar as add block procedure is concerned, a backward pointing scheme is advantageous over forward pointing scheme.

Turning now to "delete page" procedure, this action is performed when an entity, that has a protected content stored in a journal page, is hardened (i.e. no longer requires protection). By this specific embodiment, the procedure includes the following operations (exemplified with reference to FIG. 4A).

Note that the processing looks on the association database. The NVS list is a mirror of the list in the association database and, thus, scanning the list in the association database allows direct identification of the blocks in the NVS list. Bearing this in mind, the "delete page" operation simply moves from first block to last through forward pointers in the association database. Note the "freed" block in the NVS list is returned to the free list only after there is no block pointing to it, i.e. it is returned to the free list only after the next block is freed.

Note that the non-limiting embodiment of delete page procedure described above is not an atomic operation and accordingly during the Delete Page operation, the NVS is in a transient phase, containing partial linked list(s) (a partial list has a "tail" that lost its "head"). For instance, if a malfunction event occurs after removal of block (41) and before removal of block (42), the transient phase is reflected in that block (43) has a "used-chained" state and it points to block (42) which has a "used-chained" state (because the malfunction event occurred before the state of block (42) is changed to "free") and the latter points to block (41) which has a "free" state (because its state was changed before the malfunction event). Accordingly, recovery after crash must identify this transient state and recover it by completing the interrupted "delete page" operation if such exists.

Note that the invention is not bound by the specific implementation of delete page procedure, discussed above.

Turning now to the Recovery procedure, in accordance with an embodiment of the invention, it concerns finding out all the partial chains and deleting them, effectively rolling forward the interrupted operations. Rolling forward means finalizing the delete page operation until all blocks in the partial chain are properly marked (as "free") and returned to the free block database. Note, that if one or more additional event malfunction occurs whilst rolling forward, the recovery procedure is reiterated until the page is successfully deleted. Note that the use of backward pointing scheme in the NVS would be more efficient for both the delete page and recovery procedures (if required) compared to the situation that the specified procedures are applied to linked list of blocks in the NVS, using forward pointing scheme.

There follows now a brief description using a simple exemplary scenario which will serve for better understanding why it is required to delay the release of block (41) to the free blocks database only after marking block (42) as "free". Thus, consider a scenario in which block (41) is returned to the free blocks database, immediately following the designation of "free" in its block state field. Now, as may be recalled, the procedure is reiterated, i.e. control is reverted to the last block 43, and an attempt is made in a second iteration to find the first block in the list, i.e. a block having a "used-chained" state in its block state field and points (through a backward pointer) to a block having "free" in its block state field.

Now, assume, by this exemplary scenario that whilst this procedure is made (i.e. attempt to identify block (42) as the first block in the second iteration), block (41) is allocated to another task (as it is indicated as a "free block" in the free blocks database) and the latter task had changed it from "free" state to "used". Now, when block (42) is tested in order to determine whether it is the first block in the list, it indeed has a "used-chained" state in its block state field however it points (through a backward pointer) to a block (41) having "used" state (instead of "free") in its block state field (the "free" state, as recalled, was overwritten by the task that has allocated block 41) and accordingly, it is not possible to determine that block 42 is the first block in the list.

Bearing this exemplary scenario in mind, it is readily evident that if block (41) is not released to the free blocks database until the state of the following block (42) is changed to "free", then the other task cannot use block 41 and consequently the undesired scenario in which the state of block 41 is changed to "used" too early is avoided. In other words, only after having changed the status of block 42 to "free", the previous first free block (41) is added to the free blocks database to allow its re-allocation.

Note that for the recovery procedure, the data that resides in the NVS is considered consistent (although including partial lists), and as a first stage the auxiliary modules need to be restored, based on the block structure in the NVS. Thus, the blocks of the NVS are scanned to identify linked lists or partial linked lists, where the latter can be encountered as a result of interrupted "delete page" procedure. The description below will refer occasionally, for illustrative purposes only, to a specific a partial linked list that includes blocks (43) (having "used-chained" state) that points to block (42) (having "used-chained" state) that points to block (41) (having "free" state).

Note also that a partial linked list is self-descriptive (i.e. all the relevant data that pertains to the partial linked list resides in the list itself—and by the particular embodiment described above all the pertinent data resides in the block header).

Reverting to the recovery procedure, as a first stage the NVS is scanned and all lists/partial lists are identified and corresponding linked lists (or partial linked lists) are constructed in the association database, using by one embodiment forward pointers. Referring to the example above, the so constructed partial list corresponds to the partial list of blocks 43 and 42, ignoring 41 which is marked as "free". That is, the partial list in the association database would have block 42' (with "used-chained state", exactly as in block 42) pointing (using forward pointer to block 43' (with "used-chained state", exactly as in block 43).

Now, the list with forward pointers (in the association database) is used to identify blocks in the partial linked list and delete the corresponding blocks in the NVS. It is first required, however, to identify the head block of partial lists, since they are marked as "free" (e.g. block 42') instead of "used" as is the case with a conventional first block of full list. In order to identify the heads of the partial lists, the NVS is scanned again. More specifically, the beginning of the lists are identified (e.g. 43) and using the backward pointers the list is scanned until partial head is detected, i.e. a block having a "used-chained" state that points to a block having a "free" state (e.g. block 42). Now, the corresponding block in the association database (e.g. 42') is identified as a head block of a partial linked list. Now, the delete page procedure is rolled forward until end of list is encountered. Thus, for the specified example, having identified block 42' as the head, its corresponding block 42 in the NVS is deleted by marking its state as "free". Next, using the forward pointer, block 43' is handled, meaning that its corresponding block 43 is deleted, by marking it as "free" (and only now we return 42 to the free block data structure). The recovery procedure is now terminated (i.e. roll forward is completed) since block 43' is the last block in the linked list.

After this recovery phase is done, the system is ready to resume normal service mode.

To sum up, the recovery procedure by this embodiment includes:

Recovery Procedure (Performed after malfunction event)

For each block in the system

If the block state is 'used-chained' and the Prev pointer points at a block whose state is 'free'

Perform Delete Page on the found partial chain.

A variable size page in an NVS, in accordance with the non limiting embodiments described above can be used in various applications. For instance it can be used to enhance applications that hold linked lists on magnetic storage (or other storage devices that have significant access time), and consistency has to be retained in error conditions. More specifically, file systems that store meta-data on disk that is arranged in linked lists (e.g. list of free space slots), can make updates to the linked list in a more efficient (single disk write) whilst maintaining consistency, using the variable size page scheme described above. Suppose a file system maintain's a linked list of free space slots maintained on disk (part of the file system's meta-data). When some chunk of user disk space is freed (e.g. when a file is deleted or updated), an item is added to the linked list. When a chuck is allocated, an item may be removed.

The invention claimed is:

1. A method for managing variable sized pages of possibly non contiguous blocks in a Non-Volatile-Storage (NVS) for attaining a consistent NVS image that survives malfunction events; each page includes a self describing block or a linked list of self describing blocks, the method comprising:
   (a) providing auxiliary modules stored in Volatile Storage, wherein said auxiliary modules comprise free block database indicative of free blocks and association database representing replica of linked lists and partial linked lists, if any, of blocks in the NVS;
   (b) providing an atomic "create a new page" procedure;
   (c) providing an atomic "add block" procedure for adding a possibly non contiguous block to a page; the newly added block has a back pointer to a previous block in the page;
   (d) providing a "delete page" procedure for deleting all blocks in a page, wherein said "delete page" procedure comprises:
       while there are blocks in the page:
           moving from a first block to last through forward pointers in the association database and deleting a corresponding block in the NVS; a block in the NVS is returned to the free list only after there is no block pointing to it;
   (e) providing at least one recovery procedure for rolling backward said add block procedure and rolling forward the delete page procedure, in case of malfunction event, thereby attaining consistent NVS; and
   (f) managing said variable sized pages in accordance with any of steps (a) through (e).

2. A Non-Volatile-Storage (NVS) that includes variable sized pages of possibly non contiguous blocks; each page includes a self describing block or linked list of self describing blocks, using backward pointing scheme; said NVS is not susceptible to inconsistency in response to "create a new page", "add block to a page", or "delete blocks in a page" operations, irrespective of any intervening malfunction event,
   wherein said NVS further having associated auxiliary modules stored in Volatile storage; the auxiliary modules comprise free block database indicative of free blocks and association database representing replica of linked lists and partial linked lists, if any, of blocks in the NVS, and
   wherein said "delete page" procedure comprises;
       while there are blocks in the page:
           moving from first block to last through forward pointers in the association database and deleting a corresponding block in the NVS; a block in the NVS is returned to the free list only after there is no block pointing to it.

3. A system for managing variable sized pages of possibly non contiguous blocks in a Non-Volatile-Storage (NVS) for attaining a consistent NVS that survives malfunction events; each page includes a self describing block or linked list of self describing blocks, the system comprising:
   Volatile Storage storing auxiliary modules;
   means for performing an atomic "create a new page" procedure;
   means for performing an atomic "add block" procedure for adding a possibly non contiguous block to a page; the newly added block has a back pointer to a previous block in the page;
   means for performing a "delete page" procedure for deleting all blocks in a page;
   means for performing at least one recovery procedure for rolling backward said add block procedure and rolling forward said delete page procedure, in case of malfunction event, thereby attaining consistent NVS.

4. The system according to claim 3, for use in file systems that store meta-data on disk(s).

5. The system according to claim 3, wherein said auxiliary modules comprise free block database indicative of fire blocks and association database representing replica of linked lists and partial linked lists, if any, of blocks in the NVS.

6. The system according to claim 5, wherein said "add block" procedure comprises: applying atomic write that includes adding a block with a backward pointer to a previous block in the linked list of the page.

7. The system according to claim 5, wherein said "delete page" procedure comprises:
   while there are blocks in the page:
   means for moving from a first block to last through forward pointers in the association database and means for deleting a corresponding block in the NVS; a block in the NVS is returned to the free list only after there is no block pointing to it.

8. The system according to claim 3. wherein said malfunction event being an electricity power malfunction.

9. The system according to claim 3, wherein each block has the following data structure:
   Block header that includes:
       Block state: storing any of 'free'; 'used'; 'used-chained' values;
       Entity identifier: storing entity identifier and applicable if state is not 'free';
       Previous pointer: storing pointer to previous block in chain and applicable if state is 'used-chained';
       Block user data: storing data that pertains to protected entity.

* * * * *